United States Patent
Hahn

[19]

[11] Patent Number: 6,095,231
[45] Date of Patent: Aug. 1, 2000

[54] PERMANENTLY MOUNTED VEHICLE SHADE

[76] Inventor: Matthew Richard Hahn, 10845-8 Scripps Ranch Blvd., San Diego, Calif. 92131

[21] Appl. No.: 09/292,994

[22] Filed: Apr. 16, 1999

[51] Int. Cl.⁷ ...................................................... B60J 3/02
[52] U.S. Cl. .................... 160/370.22; 160/265; 296/97.8
[58] Field of Search ............................... 160/370.22, 274, 160/265, 310, DIG. 2, DIG. 3, 405; 296/97.4, 97.8

[56] References Cited

U.S. PATENT DOCUMENTS

| | | | |
|---|---|---|---|
| 4,758,041 | 7/1988 | Labeur | 160/274 X |
| 4,898,224 | 2/1990 | Woodworth | 160/370.22 X |
| 5,201,810 | 4/1993 | Ojima et al. | 160/370.22 X |
| 5,404,926 | 4/1995 | Ojima et al. | 160/370.22 X |
| 5,551,744 | 9/1996 | Liao | 160/370.22 X |
| 5,560,668 | 10/1996 | Li | 160/370.22 X |
| 5,638,884 | 6/1997 | Lin | 160/370.22 X |

*Primary Examiner*—David M. Purol
*Attorney, Agent, or Firm*—Nydegger & Associates

[57] ABSTRACT

A permanently mounted vehicle shade draws a blind across an aperture that is formed by the vehicle chassis, in order to shade the vehicle interior. To do this, a pair of hollow guide tracks are mounted on the chassis opposite the aperture from each other. For each guide track, a carriage is threaded onto a drive screw, and the drive screw is coaxially mounted for rotation within the hollow of the track. Each guide track also has a longitudinal slot, and each end of the rod is inserted into a respective slot and attached to a respective carriage. This positions the rod across the aperture. Next, a supply roller is permanently mounted on the vehicle chassis parallel to the rod. One end of the blind is attached to the rod, and the other end is attached to the supply roller. For operation, the drive screws are selectively rotated in unison. The rotation of the drive screws is converted into translational motion of the carriages, to move the attached rod and draw the blind across the aperture.

10 Claims, 2 Drawing Sheets

PERMANENTLY MOUNTED VEHICLE SHADE

FIELD OF THE INVENTION

The present invention pertains generally to shades and methods for their manufacture. More specifically, the present invention pertains to a vehicle shade for screening the interior of the vehicle from sunlight. The present invention is particularly, but not exclusively, useful as a vehicle shade which is permanently mounted on the vehicle for ease of operation and convenience of use.

BACKGROUND OF THE INVENTION

Portable vehicle shades are typically used to prevent sunlight from passing through the windshield of a vehicle and heating its interior. One of the more common portable shades is essentially a sheet of cardboard which is formed in the shape of a windshield and then folded. For operation, the portable shade is unfolded and placed between the windshield and the dashboard of the vehicle while it is parked. In this manner, the portable shade helps to maintain a relatively comfortable environment in the interior of the vehicle while it is not in use. Additionally, the portable shade prevents damage to the vehicle upholstery from sunlight that passes through the windshield. When the vehicle is to be operated, the shade is removed from the dashboard and refolded for storage.

Portable vehicle shades such as those described above can be convenient and relatively easy to use. There are certain problems associated with this type of shade, however. Specifically, the vehicle operator may forget to place the portable shade in the vehicle. After parking the vehicle, the forgotten shade is then unavailable for use. Further, it happens that portable vehicle shades are usually made of a relatively flimsy material, such as a folded sheet of cardboard. Thus, portable vehicle shades are not very durable and tend to break easily. Additionally, portable shades tend to be bulky and cumbersome. It can be inconvenient trying to quickly unfold the shade for deployment or to refold the shade for stowage, particularly if the operator is in a hurry. Finally, portable window shades tend to be sized primarily for the vehicle windshield, and may not adequately shade the vehicle interior from sunlight entering through the side or rear windows.

In light of the above, it is an object of the present invention to provide a vehicle shade which is permanently mounted in the vehicle. It is another object of the present invention to provide a vehicle shade which is more durable than a portable windshield shade. It is yet another object of the present invention to provide a vehicle shade which can screen the vehicle interior from sunlight passing through side and rear windows, as well as through the windshield. Still another object of the present invention is to provide a vehicle shade which is effectively easy to use, relatively simple to manufacture and comparatively cost effective.

SUMMARY OF THE PREFERRED EMBODIMENTS

A vehicle shade in accordance with the present invention shades the interior of the vehicle by covering an aperture, which is formed by the vehicle chassis. This aperture is formed for a windshield of the vehicle, but the aperture can also be formed for a side window or a rear window. To cover the aperture, the vehicle shade of the present invention draws an elongated blind across the aperture. To do this, a pair of hollow guide tracks are mounted on the chassis opposite the aperture from each other. For each guide track, a carriage is mounted for translational movement inside the track. Both guide tracks are formed with a longitudinal slot, and each end of a rod is inserted into a respective slot and attached to a respective carriage. This positions the rod across the aperture. Next, a supply roller is mounted on the vehicle chassis parallel to the rod. One end of the elongated blind is attached to the supply roller with the blind being initially wrapped around a supply roller. The other end of the elongated blind is attached to the rod. When the rod is moved away from the supply roller, the blind is drawn from the supply roller across the aperture. Similarly, by moving the rod towards the supply roller, the blind can be re-wrapped onto the supply roller and lowered to uncover the aperture.

A vehicle shade in accordance with the present invention also includes a mechanism for selectively moving the rod to raise or lower the blind. Specifically, each guide track includes a drive screw and a motor. For each guide track, the carriage is threaded onto the drive screw and the drive screw is coaxially positioned within the hollow of the guide track. One end of the drive screw is attached to the guide track, while the other end of the drive screw is coupled to the motor that is also mounted on the guide track. As this motor turns, the drive screw rotates within the guide track. The carriage cannot rotate with the drive screw, however, because it is attached to the rod as described above. Instead, the rotational motion of the drive screw is converted into translational motion of the threaded carriage. The direction of rotation of the drive screws can be selected to move the carriages in order to raise or lower the rod, as desired. Further, the motors are operated to rotate the drive screws in unison, in order to uniformly raise and lower the carriages. In the preferred embodiment of the invention, the motors are preferably twelve-volt direct current (12V DC) motors which are powered by the vehicle battery. The guide track is preferably made of a lightweight metal such as aluminum, the drive screw can be made of steel, brass, or plastic, and the carriage is made of a plastic material, such as nylon.

For the present invention, the vehicle shade has a raised configuration in which the blind has been drawn across the aperture to cover the aperture. The vehicle shade also has a retracted configuration in which the blind is wrapped around the supply roller and the aperture is uncovered. For safety of vehicle operation, the vehicle shade can be electronically biased towards the retracted position when the vehicle engine is operating. To do this, the vehicle shade of the present invention includes an interlock which is electronically connected to the motors for the carriages and to the vehicle engine. If the vehicle shade is in a raised configuration, the interlock sends a signal to the carriage motors whenever the vehicle engine is started. This signal causes the motors to operate to return the shade to a retracted configuration. If the shade is already in a retracted configuration when the engine is started or is running, the interlock prevents operation of the carriage motors. Thus, the interlock maintains the vehicle shade of the present invention in its retracted configuration while the vehicle engine is operating.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
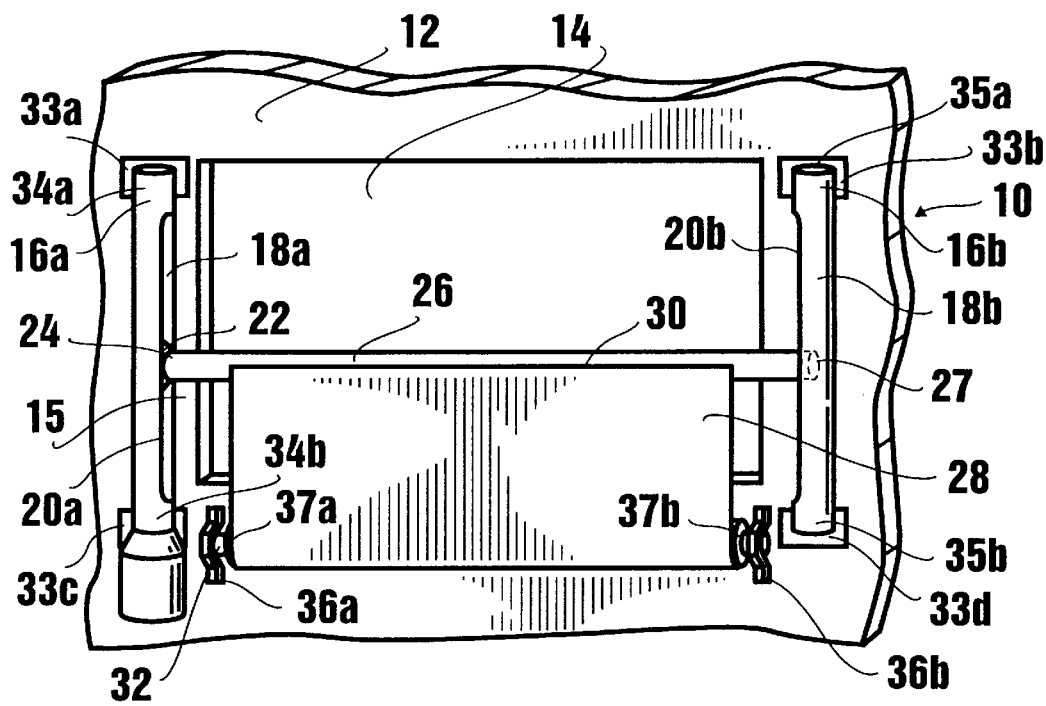
FIG. 1 is a perspective view of the vehicle shade of the present invention.

Referring initially to FIG. 1, a permanently mounted vehicle shade in accordance with the present invention is shown and generally designated 10. As shown in FIG. 1, a vehicle chassis 12 is formed with an aperture 14. This aperture 14 has a margin 15 and can be a windshield, a side window or rear window of the vehicle (not shown), and the shade 10 covers the aperture 14 to screen the interior of the vehicle from sunlight. To do this, an elongated guide track 16a is fixedly mounted on the chassis 12 and positioned along an edge of the aperture 14. This track 16a is formed with a hollow 18a and a longitudinal slot 20a, and a carriage 22 is positioned within the hollow 18a of the track 16a. Similarly, a guide track 16b is mounted opposite the aperture 14 from guide track 16a, and the guide track 16b is formed with a hollow 18b and a longitudinal slot 20b. As shown in FIG. 1, one end 24 of a rod 26 is inserted into the longitudinal slot 20 and attached to the carriage 22. The other end 27 (shown in phantom) of the rod 26 is inserted into the longitudinal slot 18b of the guide track 16b. This positions the rod 26 across the aperture 14. To cover the aperture 14, the vehicle shade 10 of the present invention includes an elongated blind 28. One end 30 of the blind 28 is attached to the rod 26, as shown in FIG. 1. The other end (not shown) of the blind 28 is attached to a supply roller 32 that is mounted on the chassis 12 substantially parallel to the rod 26. With this configuration, the blind 28 is drawn from the supply roller 32 and covers the aperture 14 when the rod 26 is moved away from the supply roller 32. Importantly, the supply roller 32 is spring loaded in a manner well known by the skilled artisan. Thus, if the rod 26 is moved towards the supply roller 32, the blind 28 will re-wrap around the supply roller 32.

The shade 10 can be mounted to the chassis 12 in the manner as described above during the assembly of the vehicle. Alternatively, the shade 10 can be provided in the form of a kit for installation on a fully assembled vehicle. When provided in kit form, the guide tracks 16 and supply roller 32 are attached to the chassis 12 in any manner well known by the skilled artisan. As an example of a manner of attachment, a plurality of Velcro® patches 33a–d can be attached to the chassis 12, as shown in FIG. 1. Velcro® patches (not shown) are also mounted to each end 34a, b of the guide track 16a and to each end 35a, 35b of the guide track 16b. The guide tracks 16 can then be attached to the chassis 12 by mating the Velcro® patches (not shown) on the tracks 16 to the Velcro® patches 33 on the chassis 12. As another example of a manner of attachment, a pair of mounting brackets 36a, 36b are attached to the chassis 12, and each end 37a, 37b of the supply roller 32 is attached to the respective bracket 36a, 36b. For either manner, or any other manner of attachment, the guide tracks 16 and supply roller 32 must be attached to the chassis 12. Once the guide tracks 16 and the supply roller 32 are attached to the chassis 12, the carriage 22, rod 26 and elongated blind 28 for the shade 10 can be assembled as described above.

Figure 2:
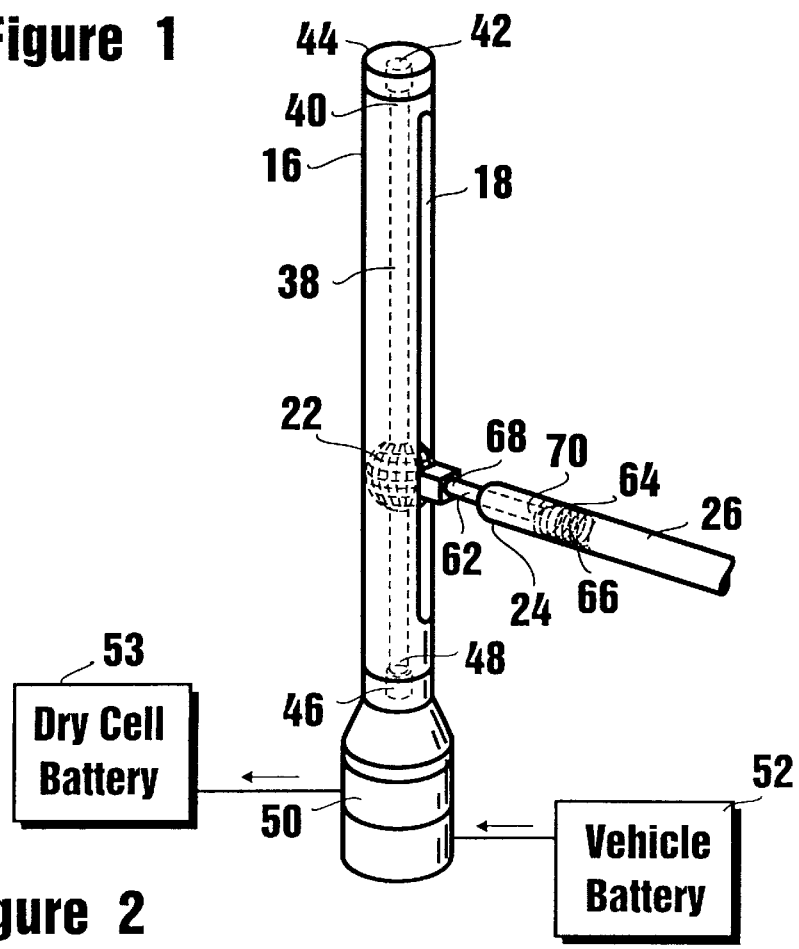
FIG. 2 is a perspective view of the guide track for the vehicle shade of the present invention with portions broken away and other portions shown in phantom to show the carriage, drive screw and electric motor in greater detail.

The manner in which the carriage 22 cooperates with the guide track 16 to move the rod 26 is best understood by referring to FIG. 2. As shown in FIG. 2, a drive screw 38 is coaxially mounted within the hollow 18 of the track 16. The carriage 22 is threaded onto the drive screw 38, and one end 40 of the drive screw 38 is mounted to a bushing 42. The end 40 of the drive screw 38 and bushing 42, in combination, are attached to an end cap 44 which is mounted on the track 16. A coupling 46 interconnects the other end 48 of the drive screw 38 to a motor 50, and the motor 50 is mounted on the guide track 16. As the motor 50 rotates the drive screw 38, the rotational motion of the drive screw 38 is converted into translational motion of the carriage 22 along the drive screw 38. Once the rod 26 is attached to the carriage 22, the rod 26 also moves in translation to draw or retract the blind 28 across the aperture 14 as desired (see FIG. 1). In the preferred embodiment of the invention, the motor 50 receives its power from a vehicle battery 52, as indicated in FIG. 2. Accordingly, since most vehicle batteries are rated at twelve volts, the motor 50 is preferably a twelve-volt direct current (12V DC) motor 50. When the shade 10 is provided in kit form, the motor 50 is powered by a portable dry cell battery 53. Alternatively, the DC motor 50 can be electrically connected in a manner well known in the prior art to the vehicle cigarette lighter (not shown). When connected in this manner, the shade 10 is powered by the vehicle electrical system (not shown) upon activation of the cigarette lighter. In the selection of materials, the carriage 22 is preferably made of a nylon plastic material, while the drive screw 38 is made of a steel, brass or nylon material. Finally, the guide track 16 has a diameter, D, of substantially five eighths of the inch (D=0.625") and is made of a lightweight metal such as aluminum.

Figure 3A:
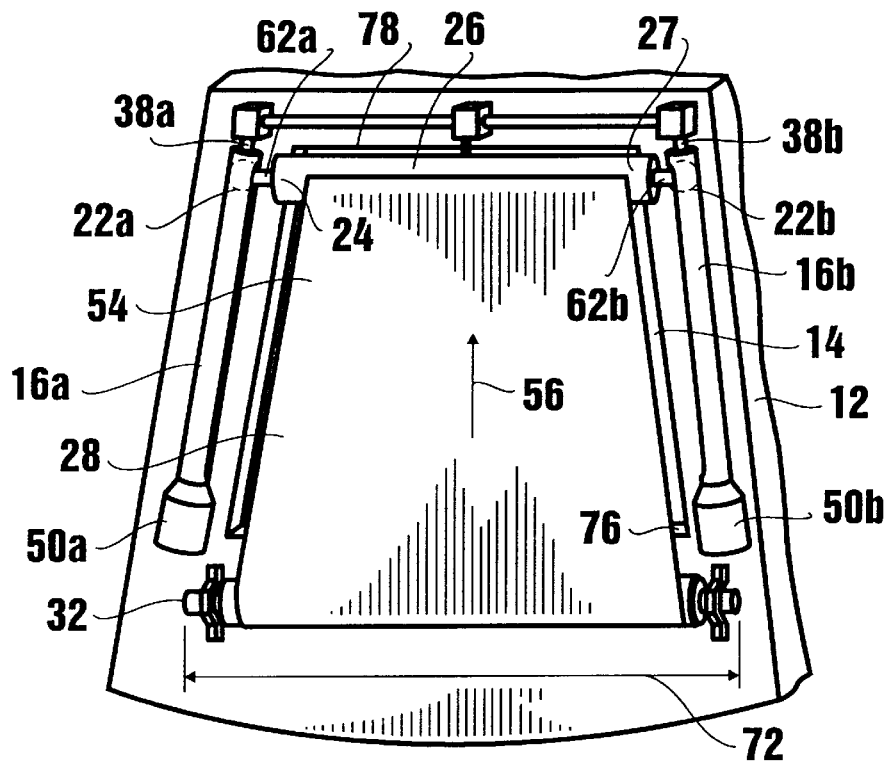
FIG. 3A is a perspective view of a vehicle shade of the present invention while in a raised configuration, with the blind covering the vehicle aperture.

Referring now to FIG. 3A, a raised configuration 54 can be defined for the shade 10. When the shade 10 is in this raised configuration 54, the blind 28 has been advanced in the direction as indicated by arrow 56 and substantially covers the aperture 14. FIG. 3A also illustrates the preferred dual-carriage embodiment of the present invention. Specifically, a pair of guide tracks 16a, 16b are mounted to the vehicle chassis 12. Next, a pair of stub shafts 62a, 62b interconnect each end 24, 27 of the rod 26 to a respective carriage 22a, 22b (shown in phantom). To do this, and referring briefly back to FIG. 2, the end 24 of the rod 26 is formed with a recess 64, and a spring 66 is placed inside the recess 64. Next, one end 68 of the stub shaft 62 is connected to the carriage 22, while the other end 70 is inserted into the recess 64 of the rod 26 to compress the spring 66. The other end (not shown in FIG. 2) of the rod 26 is assembled in the same manner. Referring again to FIG. 3A, the carriages 22a, 22b are threadably mounted onto a respective drive screw 38a, 38b, as described above. Each drive screw 38a, 38b is coaxially mounted for rotation within a respective guide track 16a, 16b, also as described above. As shown in FIG. 3A, the width 72 of the aperture 14 has a decreasing taper from the bottom 76 to the top 78 of the aperture 14. The stub shafts 62a, 62b, however, cooperate with the rod 26 as described above (see FIG. 2) and lengthen/shorten the rod 26 to conform to the tapered aperture 14. Further, the blind 28 is also tapered to conform to the aperture 14.

Figure 3B:
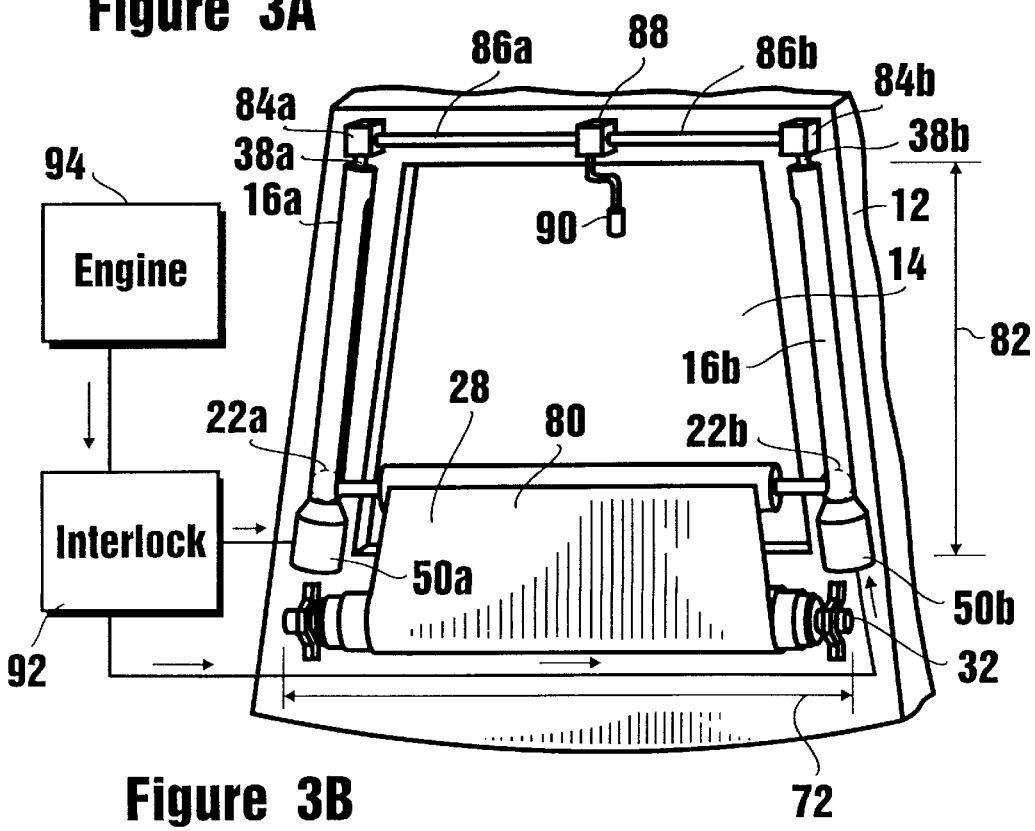
FIG. 3B is a perspective view of a vehicle shade of the present invention while in a retracted configuration, with the blind re-wrapped around the supply roller.

FIG. 3B illustrates a retracted configuration 80 for the shade 10 of the present invention. In the retracted configuration 80, the rod 26 is near the bottom 76 of the aperture 14, as shown in FIG. 3B. Further, the aperture 14 is substantially uncovered, and the blind 28 is essentially re-wrapped around the supply roller 32. For efficiency, the shade 10 draws the blind 28 only as necessary to shift back and forth between the respective raised and retracted configurations 54, 80. Accordingly, the blind 28 travels a predetermined distance between the raised and retracted configurations 54, 80. In the preferred embodiment of the invention, this predetermined distance is substantially equal to the height 82 of the aperture 14, as shown in FIG. 3B. Alternatively, if the shade 10 is oriented to draw the blind 28 widthwise across the aperture 14, the predetermined distance is substantially equal to the width 72 of the aperture 14.

FIG. 3B also illustrates an alternative manner of rotating the drive screws 38a, 38b to operate the shade 10. Specifically, each drive screw 38a, 38b is connected to a respective gearbox 84a, 84b. The gearboxes 84a, 84b are connected by a respective bar 86a, 86b to a synchronizing gearbox 88. A handle 90 is connected to the synchronizing gearbox 88 for rotating the drive screws 38a, 38b in unison. In this manner, the vehicle shade 10 of the present invention can be manually operated as desired to raise or to lower the shade 10.

By cross-referencing FIGS. 3A and 3B, it can be seen that the shade 10 of the present invention includes an interlock 92. When the motors 50 are used to rotate the drive screws 38a and 38b, this interlock 92 electronically biases the shade 10 towards the retracted configuration 80 in a manner well known in the prior art. To do this, the interlock 92 is electrically connected with the vehicle engine 94 and with the motors 50. If the shade 10 is in a raised configuration 54 (shown in FIG. 3A) when the engine 94 is started, the interlock 92 provides a signal to the motors 50. The motors 50, in response to this signal, rotate to move the carriages 22 in order to retract the blind 28 and place the shade 10 in the retracted configuration 80 (shown in FIG. 3B). If the shade 10 is already in a retracted configuration 80 that is shown in FIG. 3B when the engine 94 is started, the interlock 92 provides a signal that prevents the motors 50 from operating. Thus, the interlock 92 maintains the shade 10 in the retracted configuration 80 when the engine 94 is operating.

While the particular permanently mounted vehicle shade as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for installation on a vehicle to shade the interior of the vehicle which comprises:

a vehicle having a chassis and an aperture defined by said chassis;

an elongated guide track fixedly mounted on the chassis, said guide track being formed with a hollow and having a longitudinal slot;

a carriage positioned in said hollow for translational movement therein;

a rod inserted into said slot and attached to said carriage to position said rod across said aperture;

a supply roller fixedly mounted on the chassis substantially parallel to said rod;

an elongated blind having a first end attached to said rod and a second end attached to said supply roller; and a means for selectively moving said carriage to draw said blind from supply roller across said aperture and to retract said blind to uncover said aperture said moving means including a drive screw coaxially positioned within said hollow of said guide track and mounted to said guide track for rotation therein, said carriage being threaded onto said drive screw, and a handle mounted on said guide track for rotating said drive screw to urge said carriage into translational motion along said drive screw.

2. A device as recited in claim 1 wherein said moving means further comprises:

a drive screw coaxially positioned within said hollow of said guide track and mounted to said guide track for rotation therein, said carriage being threaded onto said drive screw; and a handle mounted on said guide track for rotating said drive screw to urge said carriage into translational motion along said drive screw.

3. A device as recited in claim 1 wherein said guide track is made of aluminum.

4. A device as recited in claim 1 wherein said aperture has a height and a width, said height being unequal to said width, said blind being drawn across said height of said aperture.

5. A device as recited in claim 4 wherein said blind is drawn through a predetermined distance, said predetermined distance being substantially equal to said height of said aperture.

6. A device as recited in claim 1 wherein said drive screw is made from a material selected from the group consisting of steel, brass or plastic.

7. A device as recited in claim 1 wherein said carriage is made of a plastic material.

8. A device as recited in claim 1 said guide track is a first guide track and said carriage is a first carriage, said device further comprising:

a second elongated guide track fixedly mounted on said chassis opposite said aperture from said first elongated guide track, said second guide track being formed with a hollow and having a longitudinal slot;

a second carriage positioned within said hollow of said second guide track for translational movement therein, said rod having a first end attached to said first carriage and having a second end inserted into said longitudinal slot of said second guide track and attached to said second carriage; and a means for moving second carriage in unison with said first carriage to draw said blind from said supply roller across said aperture and to retract said blind to uncover said aperture.

9. A shade device for screening the interior of an vehicle, said shade which comprises:

a vehicle having a frame formed with an aperture, said aperture defining a margin on said frame;

a first carriage mounted on said frame for movement in said margin;

a rod attached to said carriage to extend said rod across said aperture;

a supply roller mounted on said frame substantially parallel to said rod an elongated blind having a first end attached to said rod and a second end attached to said supply roller;

a first guide track fixedly mounted on said frame in said margin, said first guide track being formed with a hollow and having a longitudinal slot;

a first drive screw coaxially positioned within said hollow of said guide track and mounted to said guide track for rotation therein, said carriage being threaded onto said drive screw, said rod being inserted into said longitudinal slot of said guide track and attached to said carriage;

a first motor for rotating said drive screw to urge said carriage into translational motion;

a second elongated guide track fixedly mounted on said frame opposite said aperture from said first guide track, said second guide track being formed with a hollow and having a longitudinal slot;

a second drive screw coaxially positioned within said hollow of said second track and being mounted for rotation therein;

a second carriage threadably mounted on said second drive screw, said rod having a first end attached to said first carriage and having a second end inserted into said longitudinal slot of said second guide track and being attached to said second carriage; and a second motor for rotating said second drive screw to urge said second carriage into concerted translational motion with said first carriage to selectively draw said blind from said supply roller across said aperture to cover said aperture.

10. A shade as recited in claim 9 wherein said respective first and second ends of said rod are formed with a respective first and second recess and further comprising:

a first spring placed into said first recess;

a second spring placed into said second recess;

a first stub shaft having a first end and a second end, said first end of said first stub shaft being attached to said first carriage, said second end of said first stub shaft being inserted into said first recess to place said first spring in compression; and a second stub shaft having a first end and a second end, said first end of said second stub shaft being attached to said second carriage, said second end of said second stub shaft being inserted into said second recess to place said second spring in compression.

* * * * *